United States Patent [19]

Liddell

[11] 3,877,800

[45] Apr. 15, 1975

[54] IMAGE TRANSMITTING APPARATUS

[76] Inventor: William S. Liddell, P.O. Box 1533, Avalon, Calif.

[22] Filed: Sept. 25, 1972

[21] Appl. No.: 291,719

[52] U.S. Cl. ........ 353/30; 178/7.3 D; 178/DIG. 31; 250/213 R; 350/160 LC; 353/34; 353/37; 353/99; 353/120; 353/122

[51] Int. Cl. ..... G03b 21/28; G02f 1/36; H04h 1/00

[58] Field of Search .................. 350/160 R, 160 LC; 250/213 R; 178/DIG. 31, DIG. 2, 7.3 D, 7.5 D; 353/120, 122, 99, 30, 34, 32, 37, 38; 352/81

[56] References Cited

UNITED STATES PATENTS

| | | | |
|---|---|---|---|
| 3,601,468 | 8/1971 | Dailey | 250/213 R |
| 3,658,414 | 4/1972 | Fukushima | 353/30 |
| 3,706,487 | 12/1972 | Laforgia | 353/11 |
| 3,735,140 | 5/1973 | Stimler | 350/160 R |

*Primary Examiner*—Harry N. Haroian
*Assistant Examiner*—Steven L. Stephan
*Attorney, Agent, or Firm*—Fulwider, Patton, Rieber, Lee & Utecht

[57] ABSTRACT

Image transmitting apparatus including a light collimating device for receiving image bearing light rays focused onto one side thereof and operative to project collimated image carrying rays from a second side thereof to travel along a predetermined transmission path, which transmission path may be formed by various lenses and mirrors. The image carrying light rays are received at a display location and are magnified to be projected onto a display panel to display the resultant display image.

10 Claims, 11 Drawing Figures

IMAGE TRANSMITTING APPARATUS

BACKGROUND OF THE INVENTION

1. Field of the Invention

The image transmitting apparatus of the present invention relates to a device for transmitting images from one location to another and may be utilized in, for instance, closed circuit television.

2. Description of the Prior Art

Most prior art image transmitting devices employ rather sophisticated electronics for reducing a visual image to electrical information and then converting the electrical information back to a visual image. Applicant is unaware of any prior art image transmitting devices which collimate image bearing light for transmission along a predetermined transmission path.

SUMMARY OF THE INVENTION

The image transmitting apparatus of the present invention is characterized by a an optical conversion sheet which receives image bearing rays and is operative in response thereto to transmit high intensity image rays along a predetermined transmission path to a display panel.

In order to minimize interference by ambient light, the image carrying light rays may be in the infrared spectrum and, if desirable, the rays may be collimated in a relatively small cross section transmitting bundle for transmission through the transmission path to thereby minimize the overall space required for such transmission.

The objects and advantages of the present invention will become apparent from a consideration of the following detailed description when taken in conjunction with the accompanying drawings.

DESCRIPTION OF THE PREFERRED EMBODIMENTS

Figure 1:
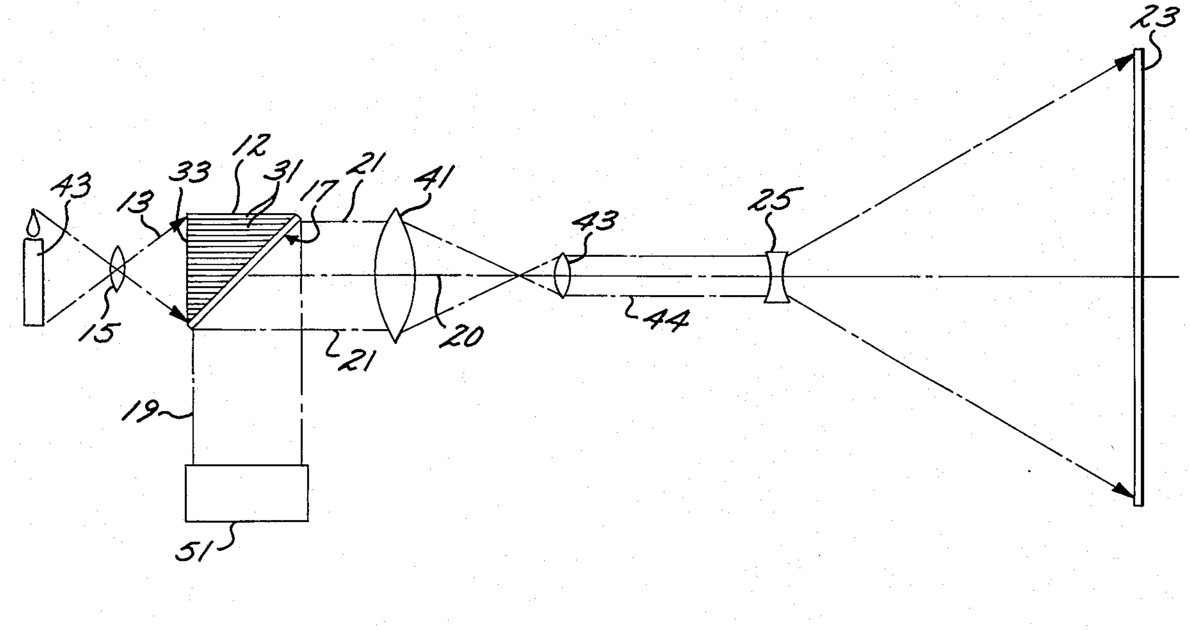
FIG. 1 is a diagramatic view of an image transmitting apparatus embodying the present invention.

Referring to FIG. 1, the image transmitting apparatus of the present invention includes, generally, a light collimating device 11 formed by an angular image transfer assembly 12 onto one side of which image bearing light rays 13 are focused by means of an object lens 15. The image transfer assembly 12 is formed with an angular end which is covered by a conversion sheet 17 which is locally reflective of collimated carrier light 19 in response to the local intensity of the transferred image bearing light 13 to thus reflect high intensity image carrying light 21 along a predetermined transmission path 20 onto a transluscent display panel 23 by means of an image diverging lens 25 to thus project a display image on the display panel 23.

The image transfer assembly 12 is made up of a series of parallel optical fibers 31 which terminate in their rear extremities in a flat screen 33 for receiving the diverging image bearing light rays 13 projected from the object lens 15. The opposite ends of the optical fibers 31 are cut on a 45° angle and have the conversion sheet 17 disposed in confronting relationship therewith to thereby transfer an image of the object 43 onto such obliquely oriented screen to allow images reflected therefrom along the optical axis of lens 15 to be transmitted and viewed without distortion.

Figure 5:
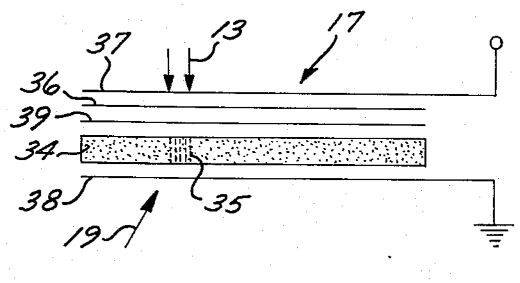
FIG. 5 is a sectional view, in enlarged scale, taken through a conversion sheet included in the image transmitting apparatus shown in FIG. 1.

The conversion screen 17 is in the nature of a screen that is locally responsive throughout its entire area to the intensity of the image bearing rays 13 to be rendered locally reflective to the carrier rays 19 in direct proportion to the intensity of such image bearing rays 13. In the preferred embodiment, such conversion screen 17 (FIG. 5) is constructed in accordance with the dipolar conversion screen described more fully in my U.S. patent application Ser. No. 168,319, filed Aug. 2, 1971 and now abandoned. Such screen is in the form of a transparent suspension plate 34 which suspends ferromagnetic opaque dipolar particles 35 in random fashion therethrough. A photoconductive plate 36 is disposed adjacent the plate 34 and normally insulates such dipolar particles 35 from the electric field of an electrically charged plate 37 forming one side of the screen, the photoconductive plate 36 and suspension plate 34 being sandwiched between the transparent electrically charged plate 37 and an oppositely charged plate 38. A reflective mirror 39 is sandwiched between the dipolar suspension plate 34 and the photoconductive plate 36 and the conversion screen 17 is arranged at 45° to the carrier light 19 along the path 20.

The carrier light 19 is projected from a carrier light source 51 which is operative to project such carrier light 19 in collimated form for reflection from the reflective mirror 39 in localized intensities corresponding with the degree to which the dipolar particles 35 are aligned therewith.

Disposed in front of the conversion screen 17 is a convex minifying lens 41 for intercepting the collimated image carrying rays 21 to converge such rays inwardly to a reduced-in-cross-section column, such rays again being collimated by means of a collimating lens 43 to be projected in a small cross section column 44.

In operation, the object lens 15 is arranged to direct light rays from an object 43 onto the image receiving screen 33 formed by the flat ends of the fiber optic bundles 31 included in the image transfer assembly 12. It will be appreciated that light across the area of the image receiving screen 33 varies in intensity corresponding with the localized reflectivity of the object 43 thus resulting in various ones of the optic fibers 31 propagating different intensity light therethrough. The light projected through the optical fibers 31 will pass through the diagonal transparent electrically charged plate 37 to strike the photoconductive plate 36 resulting in such plate being rendered locally conductive to a degree determined by the intensity of the light rays 13 for various areas thereof thus enabling an electric field to be set up between the electrically charged plates 37 and 38 having an electric force determined by the intensity of the various light rays 313.

Consequently, the ferromagnetic opaque dipolar particles 35 will be oriented perpendicular to the electrically charged plate 37 and 38 to a degree determined by the intensity of the electrical field, the particles 35 where the field is most intense being oriented perpendicular to the plates 37 and 38 thus providing for passage therepast of the greatest portion of the carrier light 19 to be reflected from the mirror 39 (FIG. 5) and back past such particles. Consequently, the rays 21 reflected along the transmission path 20 act as image carrying rays.

The light rays 21 reflected from the diagonal conversion screen 17 will project in collimated fashion along the axis 20 to be converged inwardly by the minifying lens 41 for again being collimated by means of a collimating lens 43 for projection in a relatively small cross section bundle 44 to the image lens 25. It will be appreciated that in practice the transmission bundle 44 is normally enclosed in an opaque tube to block interference by ambient light. The entire cross section of light in the bundle 44 will pass through the concave image lens 25 to be diverged to magnify the image for display on the display panel 23.

Figure 2:
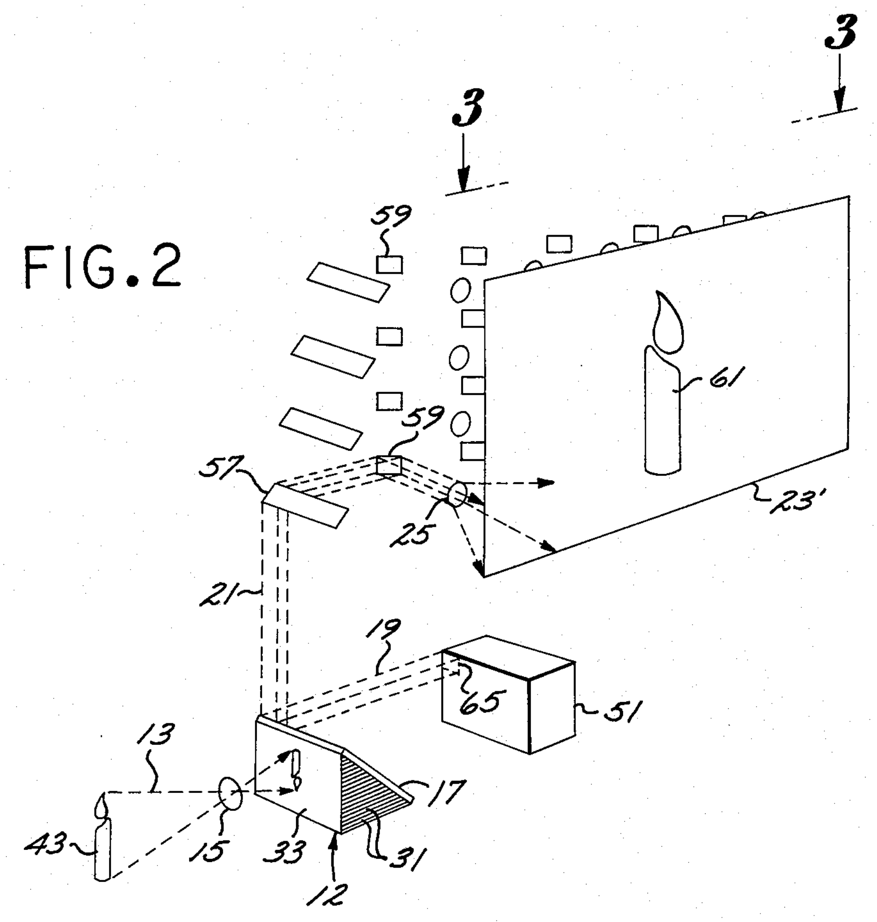
FIG. 2 is a perspective schematic view of a modification of the image transmitting apparatus shown in FIG. 1.

The image transmitting apparatus shown in FIG. 2 is substantially the same as that shown in FIG. 1 except that is provides for magnification of an image 61 of the object 43 for display in an undistorted manner on a relatively flat display panel 23'.

Figure 3:
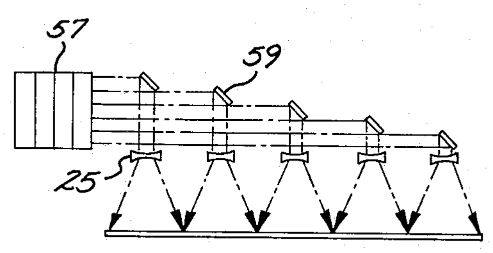
FIG. 3 is a horizontal sectional view taken along the line 3—3 of FIG. 2.
Figure 4:
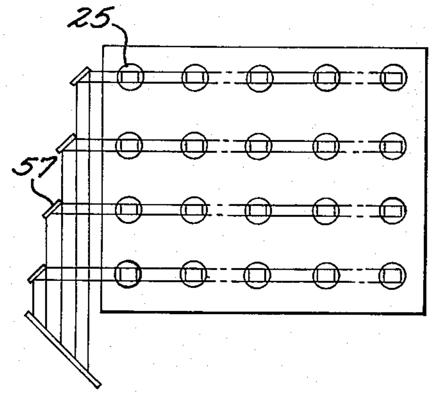
FIG. 4 is an elevational back view of the image transmitting apparatus shown in FIG. 3.

The composite bundle of rays 21 are directed vertically upwardly from light collimating image transfer assembly 12 onto an array of longitudinal horizontally extending mirror slats 57 which are disposed at angles of 45° to be horizontal and are spaced vertically apart at points equidistant along the vertical length of the display panel 23' (FIG. 4) and are laterally offset from one another to cooperate in confronting the entire horizontal plane of the conversion screen 17. Thus each mirror slat 57 reflects a rectangular bundle of rays 21 horizontally in front of the panel 23' and onto individual sets of vertical rectangular 45° mirrors 59 that are spaced at equidistant points horizontally along the panel 23' and offset from one another (FIG. 3) so a set of five such mirrors intercepts the rays from one slat 57 and projects such rays toward the transluscent display panel 23'. The entire bundle of rays intercepted by each of the individual vertically extending mirrors 59 are projected through respective image lenses 25 which serve to diverge such rays and direct them onto separate areas of the display panel 23' (FIGS. 2 and 3), it being appreciated that the entire array of lenses 25 serve to display the composite image 61 of an object 43.

For the purposes of this application, operation of the apparatus shown in FIG. 2 will be described by tracing projection of one small rectangular bundle 65 of carrier rays 21 along the transmission path, it being appreciated that such bundle will be reflected upwardly from the conversion screen 17 and onto the face of a downwardly facing diagonal mirror slat 57 to be directed onto a vertical diagonal mirror 59. The bundle of carrier rays 21 reflected from the respective vertical diagonal mirrors 59 will be projected through respective diverging lenses 25 to direct the resultant image 61 on the display panel 23', it being appreciated that the individual images from the entire array of diverging lenses 25 cooperate to form a composite image 61. It will be clear that the greater the number of separate light bundles that are formed for being directed through the respective lenses 25, the flatter the display panel 23' may be without undue distortion.

Figure 6:
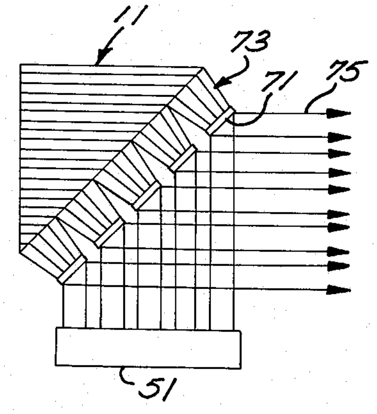
FIG. 6 is a partial diagramatic view of a modification of the image transmitting apparatus shown in FIG. 2.

The modification of the image transmitting apparatus shown in FIG. 6 is intended to eliminate any distortion, such as diffraction, introduced by the edges of the respective mirrors 57 and 59. This is done by providing segmenting conversion screens 71 in front of the collimating device 11 and interposing separate frustrums of fiber optic bundles 73 between such segmental conversion screens 71 and collimating device 11 to thus provide reduced-in-size image carrying bundles 75 projecting from the respective conversion sheets 71 to thus avoid impinging on the edge surfaces of the respective mirrors 57 and 59. The diverging lenses 25 are then modified to magnify the component images adequately to cover the entire surface of the display screen 23 to thereby form a composite image 61.

Figure 7:
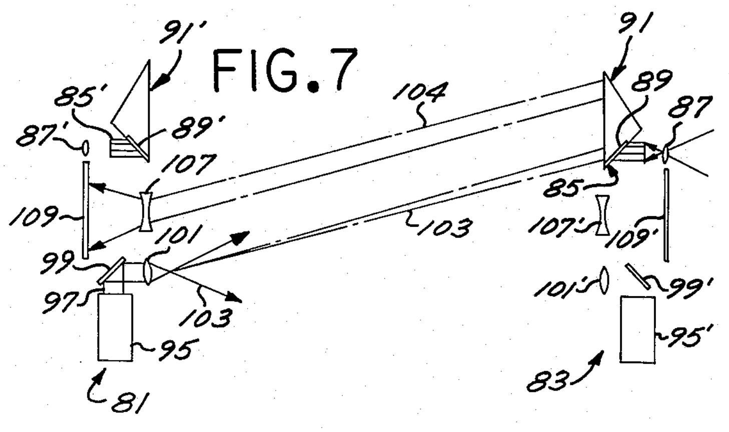
FIG. 7 is a diagramatic view of a second embodiment of the image transmitting apparatus of the present invention.

The image transmitting apparatus shown in FIG. 7 includes a pair of combination transmitters and receivers, generally designated 81 and 83, the combination 83 including a collimating device, generally designated 85, of fiber optics similar to device 11 with an optic lens 87 being disposed therebehind. The diagonal surface of the collimating device 85 is covered with a conversion sheet 89 which is mounted on one wall of a paralleling mirror reflector 91 which is constructed of three mutually perpendicular mirrors arranged to receive light rays from a particular direction and reflect such light rays through the three mirrors to emit therefrom in a direction parallel to the first direction.

The combination 81 includes a carrier light source 95 which emits collimated light 97 which is reflected from a mirror 99 to be converged by a lens 101 to form diverging rays 103, a portion of which strikes the conversion panel 89. The carrier light 103 so striking such conversion panel 89 will be reflected therefrom and will reflect sequentially from the remaining two mirrors in the reflector 91 to be reflected as image carrying rays 104 to travel back along the transmission axis projecting substantially parallel to the axis from the converging lens 101 to the conversion panel 89. The slightly diverging image carrying rays 104 will strike a diverging lens 107 to be further diverged for magnifying the resultant image for display on a panel 109. It will be appreciated that display panel 109 may be in the form of a conversion sheet similar to the conversion sheet 89 to enable such panel to be illuminated with a high intensity light for intensifying the image displayed thereon. Further, in certain instances, the photoconductive sheet in the conversion panel acting as a display panel 109 is rendered responsive to infrared light outside the visible spectrum to enable a source 95 of infrared light to be employed thus minimizing atmospheric absorption of the transmitting light.

Figure 8:
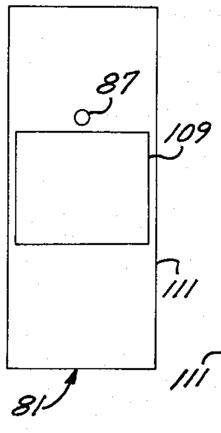
FIG. 8 is a front view of a combination transmitter-receiver included in the image transmitting apparatus shown in FIG. 7.
Figure 9:
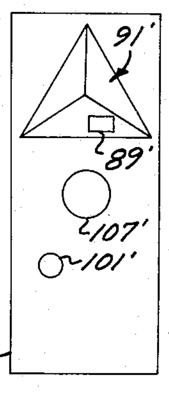
FIG. 9 is a back view of a combination transmitter-receiver included in the image transmitting apparatus shown in FIG. 7.

Referring to FIGS. 8 and 9, the combination transmitter-receiver 81 is mounted in a housing 111, it being appreciated that each such unit 81 and 83 includes both the transmitting-receiving elements depicted by source 95 and panel 109, as well as the reflective capability provided by the reflector 91, the complementary elements being indicated by primed numbers in FIGS. 7 and 9. In practice, the housings 111 are sufficiently small to be hand held, and the separate units 81 and 83 will be carried by different users much the same as present day walkie-talkies.

In operation, the user carrying the unit 81 will orient such unit to direct the carrier light 103 toward the user of the unit 83, and such user will orient his unit 83 to focus an image to be transmitted on the conversion sheet 89, it being appreciated that such image will normally be of the user himself. The slightly diverging light rays 103 will strike the conversion panel 89 to pick up the image content and will then be reflected from the reflector 91 as image-carrying rays 104 which are diverged by the image lens 107 to form the desired image on the display panel 109.

Figure 10:
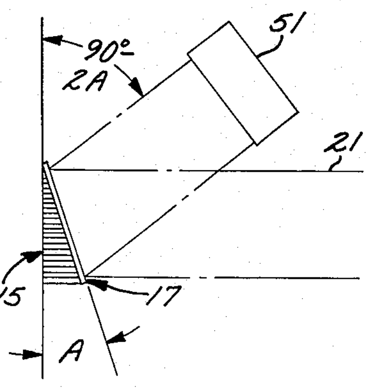
FIG. 10 is a diagramatic view of a second modification of the image transmitting apparatus shown in FIG. 1.

Referring to FIG. 10, it will be appreciated that a collimating device, generally designated 115, similar to the collimating device 11, may be provided which has the conversion screen end thereof formed at an angle A which is much less than 45° to thus conserve space and also conserve the use of optic fibers. The image carrier light source 51 will then be arranged at the angle of 90° −2A from a line perpendicular to the axis defined by the light carrier rays 21 to provide for the desired direction of reflection as dictated by the angle of incidence.

Figure 11:
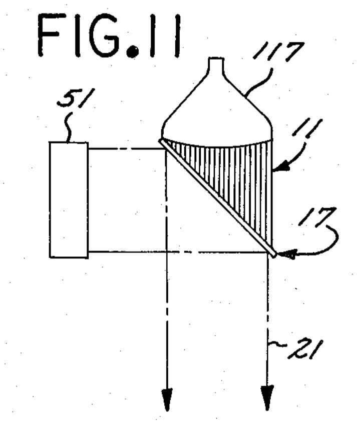
FIG. 11 is a diagramatic view of a third modification of the image transmitting apparatus shown in FIG. 1.

Referring to FIG. 11, a television picture tube 117 may have the image thereof focused on the back side of the collimating device 11, or the image surface thereof placed in contact with the collimating device 11, and the resultant image projected therefrom may be magnified as shown in FIGS. 1 or 2 to produce a magnified image 61 displayed on the display panel 23.

From the foregoing, it will be apparent that the image transmitting device of the present invention provides economical means for transmitting an image from one place to another and for magnifying such image at the point where it is to be displayed.

I claim:

1. Image transmitting apparatus for transmitting light between remote locations, said apparatus comprising:

first and second housings;

first and second optically reflective conversion sheet means mounted on said respective first and second housings for receipt of low intensity image bearing light from respective first and second objects and locally operative in response to the intensity of the image bearing light to proportionately vary the optical reflectivity thereof;

first and second intensified light sources mounted on said respective first and second housings for directing high intensity light onto said respective second and first conversion sheet means for reflection therefrom as respective first and second high intensity image transmitting light having local intensities corresponding with the local reflectivity of such respective second and first conversion sheet means;

first and second light transmitting means mounted on said respective first and second housings for receiving the respective second and first high intensity image transmitting light reflected from the respective first and second conversion sheet means and transmitting it along respective paths to said respective second and first housings; and first and second display panel means on said respective first and second housings for receiving said respective second and first high intensity image transmitting light from said respective first and second transmitting means and operative in response thereto to display images corresponding with the respective second and first objects.

2. Image transmitting apparatus as set forth in claim 1 wherein:

said first conversion sheet means includes a generally transparent dipolar suspension plate including suspension fluid contained therein and substantially opaque elongated ferromagnetic particles suspended in random fashion in said fluid, said particles being characterized in that they are responsive to various levels of electrical field applied thereto to align with the lines of force of said field to a degree proportionate to the local strength of said field, said first sheet means further including electrical control means for generation of said electrical field and responsive to the local intensity of said image bearing light to vary the local strength of said field proportionate thereto.

3. Image transmitting apparatus as set forth in claim 1 that includes:

image transfer means mounted on said first housing adjacent said conversion sheet means for transferring said low intensity image bearing light from said object for projection on said first conversion sheet means.

4. Image transmitting apparatus as set forth in claim 1 that includes:

object lens means on said first housing and interposed between said first object and said first conversion sheet means, said first conversion sheet being disposed at an oblique angle with respect to the optical axis of said lens means;

image transfer means on said first housing and including a plurality of parallel optical fibers disposed in side-by-side relationship and terminating at their respective one ends in a plane disposed perpendicularly to the optical axis of said lens means and arranged in the focal plane of said lens means and terminating at their opposite extremities in an oblique plane extending obliquely to said axis and wherein;

said first conversion sheet means is disposed on said oblique plane.

5. Image transmitting apparatus as set forth in claim 1 wherein:

said first conversion sheet means is interposed between said first object and said first intensified light source and said electrical control means includes mirror plate means and photoconductive plate means disposed on the side of said dipolar suspension plate opposite said transmitting means; and oppositely charged electrically conductive plate means sandwiching said dipolar suspension sheet, mirror plate means and photoconductive plate means therebetween, said photoconductive plate means first being responsive to image carrying light from said first object to be rendered locally permeable to the electrical field from said charged plates in proportion to the intensity of said image bearing light to correspondingly align said dipolar particles for transmission therepast of a proportionate amount of said high intensity light for reflection from said mirror plate means for transmission through said light transmitting means.

6. Image transmitting apparatus as set forth in claim 1 that includes:

a reflector mounted in said respective first and second housings for receiving intensified image bearing light reflected from said conversion sheet means of said respective first and second housings and reflecting it back along an axis substantially parallel to an axis from said respective intensified light source means to said respective conversion sheet means of said respective first and second housings to be directed at said display panels in said respective second and first housings.

7. Image transmitting apparatus as set forth in claim 1 wherein:

said image transmitting means includes optic means for converging said high intensity image bearing light from said conversion sheet means to a reduced-in-cross section bundle of light and optical paralleling means for transmitting said bundle to said display location.

8. Image transmitting apparatus as set forth in claim 1 wherein:

said light source includes means for collimating said high intensity light.

9. Image transmitting apparatus for converting low intensity image bearing light into high intensity image transmitting light and transmitting such light to a remote display location, said apparatus comprising:

optically reflective conversion sheet means for receipt of said low intensity image bearing light from an object and locally operative in response to the intensity of said image bearing light to proportionately vary the optical reflectivity thereof;

an intensified light source for directing said intensified light onto said conversion sheet means for reflection therefrom at intensities corresponding with the local reflectivity of said conversion sheet means;

light transmitting means for receiving the high intensity image transmitting light emitted from said conversion sheet means and transmitting it along a predetermined path to a display location;

a plurality of individual dispersing reflection means interposed in said predetermined path and spaced therealong for receiving different portions of the composite image transmitting light to form distinct bundles thereof directed along a transmission path;

a plurality of light diverging means spaced along said transmission path for receiving said bundles to diverge said image transmitting light to form a composite image; and display panel means for receiving said composite image.

10. Image transmitting apparatus as set forth in claim 9 wherein:

said plurality of individual despersion reflecting means includes a first set of light reflection devices spaced at equal spacings along one axis of said display panel means and offset laterally from one another for individually receiving said image carrying light and directing it along a second axis of said panel in discrete bundles and said plurality of light diverging means includes an array of light reflection devices including a plurality of said reflection devices for each one of said first set and spaced at equal spacings along said second axis and offset laterally from one another for intercepting discrete portions of said respective bundles of light reflected from said individual light refraction devices of said first set and oriented to direct said discrete portions toward said display panel to form a composite image on said panel.

* * * * *

UNITED STATES PATENT OFFICE
CERTIFICATE OF CORRECTION

Patent No. 3,877,800 Dated April 15, 1975

Inventor(s) William S. Liddell

It is certified that error appears in the above-identified patent and that said Letters Patent are hereby corrected as shown below:

In the specification, Column 3, line 14, correct "313" to read -- 13 --.
In the claims, Claim 7, Column 7, line 29, delete "location" and substitute therefor -- panel means --.

Signed and sealed this 15th day of July 1975.

(SEAL)
Attest:

RUTH C. MASON
Attesting Officer

C. MARSHALL DANN
Commissioner of Patents and Trademarks